(12) United States Patent
Hausig (10) Patent No.: US 8,635,524 B2
(45) Date of Patent: Jan. 21, 2014

(54) SYSTEM AND/OR METHOD FOR DOCUMENT CONVERSION

(75) Inventor: Nils Hausig, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 1785 days.

(21) Appl. No.: 11/225,971

(22) Filed: Sep. 13, 2005

(65) Prior Publication Data
US 2013/0124983 A1    May 16, 2013

(51) Int. Cl.
*G06F 17/00*    (2006.01)
(52) U.S. Cl.
USPC .......................................... 715/249; 715/235
(58) Field of Classification Search
USPC ................................. 715/249, 243, 234, 235
See application file for complete search history.

(56) References Cited

U.S. PATENT DOCUMENTS

| | | | |
|---|---|---|---|
| 6,023,714 A * | 2/2000 | Hill et al. | 715/235 |
| 6,278,448 B1 * | 8/2001 | Brown et al. | 715/866 |
| 7,143,344 B2 * | 11/2006 | Parker et al. | 715/236 |
| 7,383,498 B1 * | 6/2008 | Hickl et al. | 715/235 |
| 7,398,464 B1 * | 7/2008 | Wei et al. | 715/239 |
| 7,458,016 B1 * | 11/2008 | Desai et al. | 715/234 |
| 2003/0182450 A1 * | 9/2003 | Ong et al. | 709/246 |
| 2003/0233620 A1 * | 12/2003 | Vedullapalli et al. | 715/522 |
| 2004/0172584 A1 * | 9/2004 | Jones et al. | 715/500 |
| 2005/0132284 A1 * | 6/2005 | Lloyd et al. | 715/517 |
| 2005/0160359 A1 * | 7/2005 | Falk et al. | 715/513 |
| 2007/0028167 A1 * | 2/2007 | Spada | 715/530 |
| 2007/0061710 A1 * | 3/2007 | Chartier et al. | 715/523 |

* cited by examiner

*Primary Examiner* — Adam M Queler
(74) *Attorney, Agent, or Firm* — Wolfe-SBMC (57) ABSTRACT

Embodiments of methods, apparatuses, devices and systems associated with document conversion are disclosed. In one particular implementation, an apparatus is provided which includes a document conversion program capable of generating at least a portion of a first document based at least in part on one or more portions of data from a second document.

29 Claims, 4 Drawing Sheets

SYSTEM AND/OR METHOD FOR DOCUMENT CONVERSION

BACKGROUND

Embodiments of the invention relate to the field generating one or more secondary documents based on one or more primary documents.

BRIEF DESCRIPTION OF DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

Figure 1:
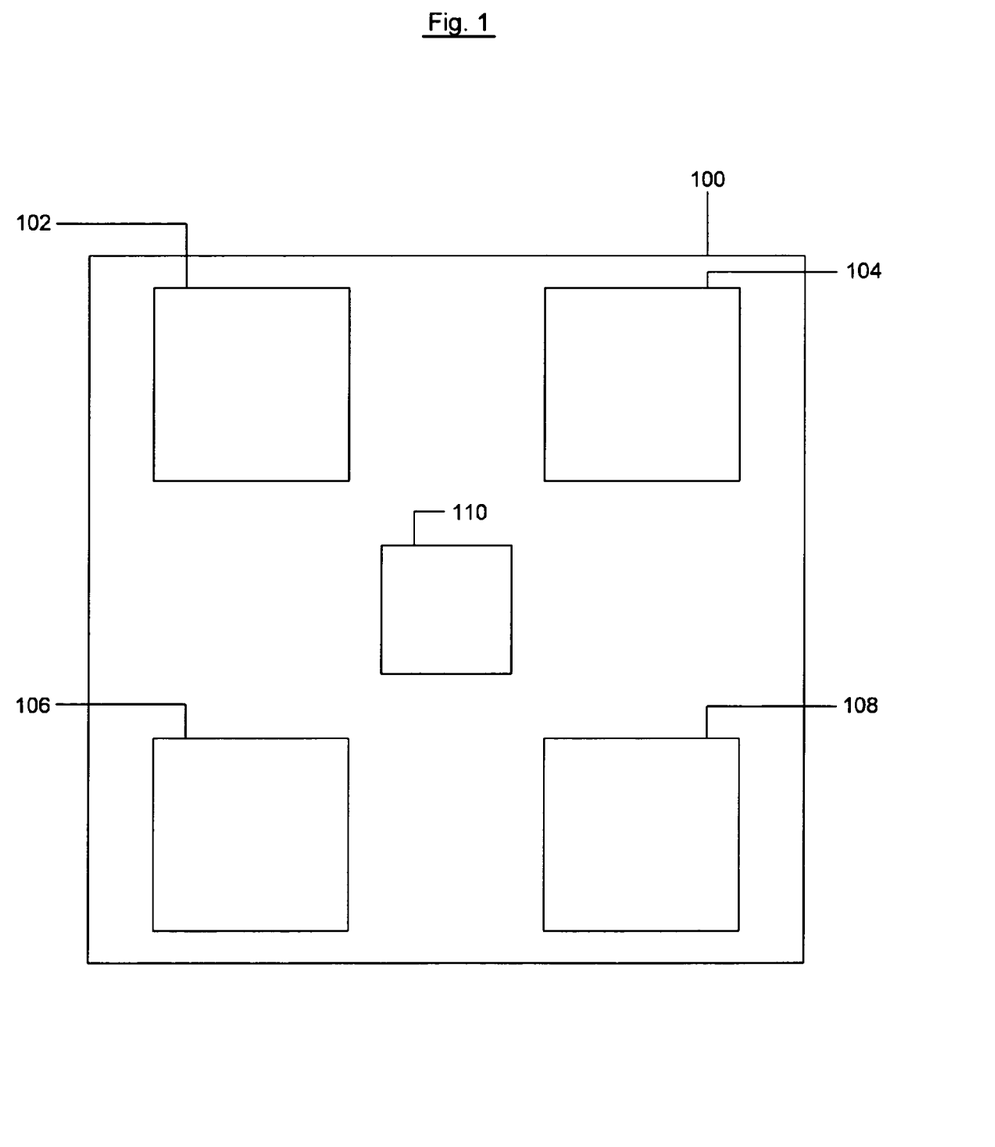
FIG. 1 is a schematic diagram of an embodiment, such as a document conversion program.

FIG. 1 is a schematic diagram of an embodiment 100, such as a document conversion program, for example. In this context, a document may mean one or more computing system readable files capable of at least in part conveying one or more pieces of information, such as one or more portions of text and/or data stored in one or more computing system and/or computing platform readable files, for example. By way of example, a document may comprise one or more respective portions of text, images, and/or data. For additional example, a document may comprise data stored in one or more files in memory and/or a visual representation, such as a visual rendering of the data with one or more computer displays, for example, such as in conjunction with a graphical user interface. Though it should be noted that this is merely an illustrative example relating to a document and that claimed subject matter is not limited in this regard. It should be noted that this is merely an illustrative example relating to one or more documents and that claimed subject matter is not limited in this regard. In this context a document conversion program may mean one or more computing system executable instructions organized into a one or more software, shareware, freeware, and/or firm ware programs, one or more subroutines, one or more objects, and/or combinations thereof, for example, capable of at least in part generating a first document based at least in part on a second document. As one potential example, a computing system and/or a computing platform may include one or more processing units or processors, one or more input/output devices, such as a display, a keyboard and/or a mouse, and/or one or more memories, such as static random access memory, dynamic random access memory, flash memory, and/or a hard drive, although, again, claimed subject matter is not limited in scope to this example.

In this context an object may mean one or more computing system and/or computing platform executable instructions, which may be stored in a memory associated with a computing system and/or computing platform, along with one or more data units and/or portions of data, for example. In this context, embodiment 100 may comprise one or more computing system executable instructions capable of converting a document, such as a source document, into a second document based at least in part on one or more portions of content in the first document, for example. In this context content may mean one or more pieces of data that may be capable of at least in part conveying information, such as words, number, letters, symbols, images, and/or combinations thereof, for example.

Embodiment 100 may comprise one or more objects, such as a content extraction object 102, a style conversion object 104, a content container object 106, a content transforming object 108, and/or a content updating object 110, for example. In this context, content extracting object 102 may comprise one or more computing system executable instructions capable of locating, obtaining, and/or receiving one or more portions of content from a document, for example. In this context, one or more portions of content may comprise date, style characteristics, and/or data layout, for example. Content extracting object 102 may further comprise one or more links to one or more portions of content for example. In this context a link may comprise one or more paths to one or more locations where a document and/or one or more portions of a document may be located, such as a universal resource locator, a directory path, and/or a data pointer, for example. Though, it should be noted that this is merely an illustrative example relating to a content extracting object and that claimed subject matter is not limited in this regard.

In this context, style conversion object 104 may comprise one or more computing system executable instructions, which may be stored in memory, and which, when executed, such as by a computing system, may be capable of mapping one or more style characteristics and/or structural elements associated with one or more portions of data in a document with one or more display and/or style characteristics that may be associated with one or more portions of data in a second object, for example. In this context, style conversion object 104 may comprise one or more rules and/or rule sets for mapping style characteristics. In this context a rule may mean a method for performing an operation and/or obtaining a result, for example. Though, it should be noted that this is merely an illustrative In this context, structural elements may mean one or more layout characteristics with a document, such as relative positioning of one or more portions of content on a page, for example, though claimed subject matter is in no way limited to this example. In this context display and/or style characteristics may mean one or more parameters that may be applied to a visual rendering, such as with one or more computing systems, of one or more pieces of data, such as text, images, numbers, and/or combinations thereof, in a first document, for example. For example, a style characteristic may comprise a font, a character size, a character color, one or more character emphases, such as italicized, bolded, and/or underlined text and/or numbers, and/or combinations thereof that may be associated with content in a first document. In this context a display style characteristic may mean one or more parameters that may be applied to a display, such as with one or more computing systems, of one or more pieces data, such as text, images, numbers, and/or combinations thereof, in a second document, for example. For example, a display style characteristic may comprise a font, a character size, a character color, one or more character emphases, such as italicized, bolded, and/or underlined text and/or numbers, and/or combinations thereof, that may be associated with content in a second file. Though, it should be noted that this is merely an illustrative example relating to style characteristics that may be applied to content and that claimed subject matter is not limited in this regard. By way of example, style conversion object 104 may include a rule for mapping an encoding of bold, italicized, and/or underlined text in a publishing and/or word processing document to an encoding of bold, italicized, and/or underlined text in a mark up language based document, such as a document that may be viewed using a web browser, such an hypertext markup language document and/or an extensible markup language document, to name but a few examples. Furthermore, style conversion object 104 may further include a rule for mapping an encoding of a particular font having a size and/or a color in a publishing and/or word processing document to an encoding of a similar and/or the same font having a same and/or similar size and/or color in a mark up language based document, to name but a few examples. By way of example, a mapping of structural elements may comprise a mapping of relative position of one or more portions of content to one or more content style sheet (CSS) layers, such as in one or more html documents, for example. Though, again, it should be noted that this is merely an illustrative example relating to a mapping and that claimed subject matter is not limited in this regard. In addition, style conversion object 104 may further comprise one or more computing system executable instructions capable of allowing one or more user to edit the existing and/or generated mapping rules. In this way a user may modify the mapping rules and one or more style characteristics that may be applied to one or more portions of content in a generated document, for example. In this context a user may modify one or more style characteristics of a generated document without having to manually encode the modified style characteristics, for example. Though, again, it should be noted that this is merely an illustrative example relating to a style conversion object and that claimed subject matter is not limited in this regard.

In this context, content container object 106 may comprise one or more computing system executable instructions to receive the extracted one or more portions of content from the first document, for example. In this context, embodiment 100 may place the extracted and/or obtained one or more portions of content in content container object 106, which may at least in part form a portion of a second document, for example. In this context, content transforming object 108 may comprise one or more computing system executable instructions capable, based at least in part on the mapping of style characteristics in style conversion object 104, modify the extracted one or more portions of content in content container object 106, for example. As one potential example, content transforming object 108 may encode at least a portion of the extracted one or more portions of content with a particular font based at least in part on a mapping of a particular font associated with the at least one portion of the one or more portions of content in the first document, though, again, it should be noted that claimed subject matter is not limited in this regard.

In this context content updating object 110 may comprise one or more computing system executable instructions capable of updating the one or more portions of extracted content at one or more times, for example. Updating object 110 may further comprise one or more links to the one or more portions of content from the source document, for example. By way of example, updating object 110, may, in response to one or more events, determine if the source document has changed, for example by checking one or more dates associate with the source document, such as a last modified date. For example, if the last modified date is after the one or more portions of content were extracted then updating object 110 may initiate one or more update processes, though again it should be noted that claimed subject matter is not limited in this regard. In this context the one or more updating processes may comprise re-extracting the one or more portions of content, replacing the one or more portions of content in container object 106 with the re-extracted one or more portions of content and transforming the re-extracted one or more portions of content based at least in part on content conversion object 104, though, of course, claimed subject matter is not limited in this regard. In this context, transform may mean to change in composition or structure, to change the outward form or appearance of, and/or to change in character or condition, such as by changing one or more display characteristics, for example, though, of course, claimed subject matter is not limited in this regard.

Figure 2:
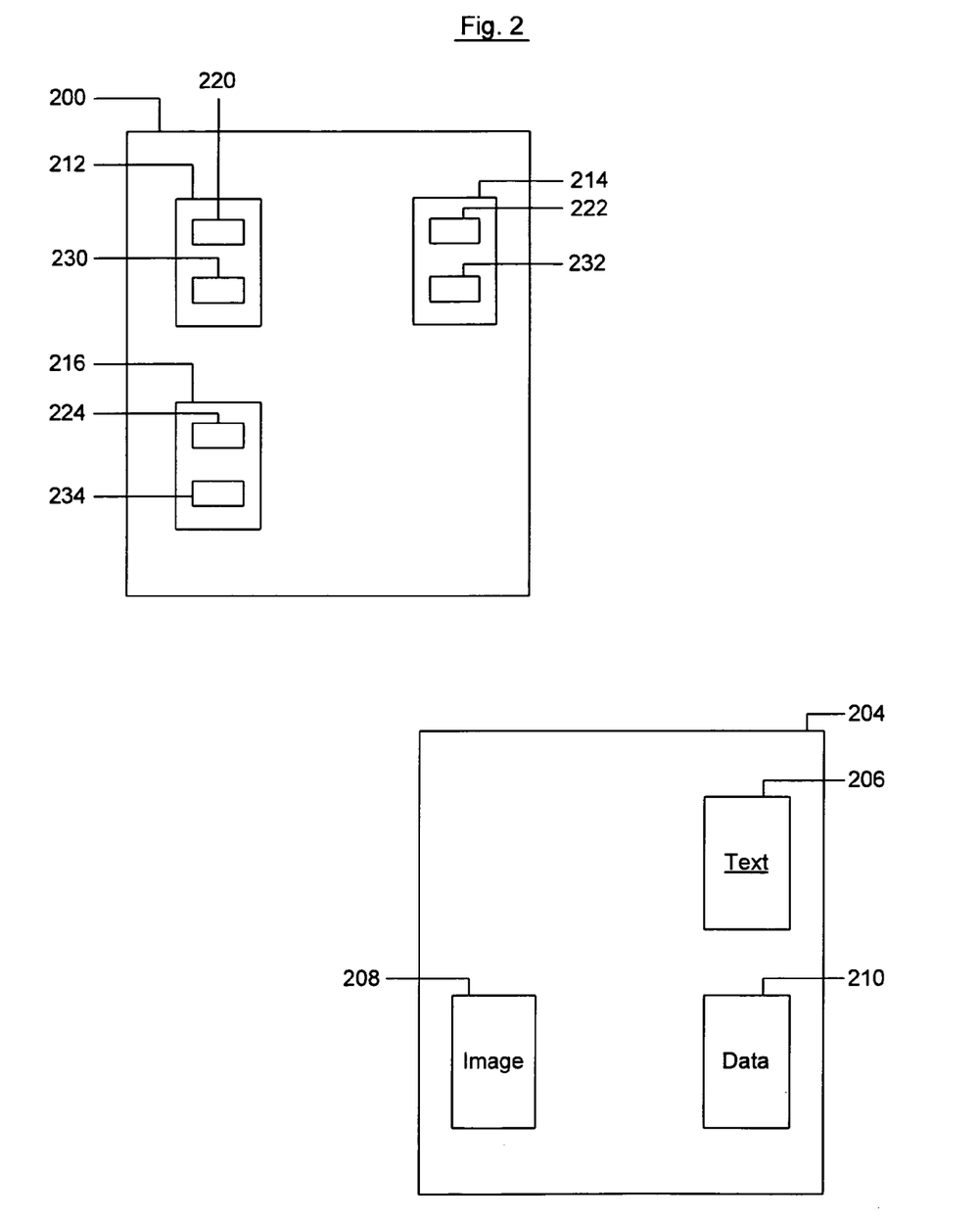
FIG. 2 is a schematic diagram of an embodiment, such as a first document generated based at least in part on a second document.

FIG. 2 is a schematic diagram of an embodiment, such as a first document 200, which may, for example, comprise a generated document, along with a second document 204, such as one or more source documents, though it should be noted that claimed subject matter is not limited to this example. In this context the generated document and/or the source document may comprise one or more portions of data stored in memory and/or rendered for display, for example, by one or more computing platforms, though, of course, claimed subject matter is not limited in this regard. In this context, first document 200 may comprise one or more documents generated, based at least in part, on second document 204, for example. For example, second document 204 may comprise one or more portions of data, such as text 206, image 208 and/or data 210, for example. First document 200 may, in this context, at least in part comprise one or more container objects, such as container object 212, container object 214 and/or container object 216, for example. In this context, container object 212, 214, and/or 216 may comprise one or more links to one or more portions of second document 204. By way of example, container object 212 may comprise a link 220 which may, in this context, provide one or more paths to text 206. Furthermore, container object 214 may, in this context, comprise a link 222, which may provide one or more paths to image 208, for example. In addition, container object 216 may comprise a link 224 which may, in this context, provide a link to data 210, for example, though, again, it should be noted that claimed subject matter is not limited to this example. Furthermore, container object 212 may further comprise one or more portions of text 230, for example. In this context, one or more portions of text 230 may comprise one or more transformed portions of text 206, for example. Container object 214 may likewise further comprise an image 232, for example. In this context, image 232 may comprise one or more transformed portions of image 208, for example. In addition, container object 216 may further comprise one or more portions of data 234. In this context, one or more portions of data 234 may comprise one or more transformed portions of data 210, for example. It should, however, be noted that this is merely an illustrative example, relating to one or more container objects and that claimed subject matter is not limited in this regard.

First document 200 may further comprise one or more computing system executable instructions to receive, render, and/or display one or more extracted portions of second document 204, such as text 206, image 208, and/or data 210, for example. In this context, the one or more extracted portions of second document 204 may be extracted by one or more programs, such as content extraction object 102, for example. Though, it should be noted that this is merely an illustrative example relating to a generated document and that claimed subject matter is not limited in this regard. In this context first document 200 may further comprise one or more computing system executable instructions capable of interacting with one or more other programs, sub-routines, and/or objects, such as content transforming object 108 and/or style conversion object 104, for example.

In this context, style conversion object 104 may comprise one or more computing system executable instructions capable of mapping one or more display and/or style characteristics associated with text 206, image 208 and/or data 210 of second document 204 to one or more display and/or style characteristics that may be associated with text 206, image 208, and/or data 210 in first document 200, for example. In this context style characteristics may mean one or more parameters that may be applied to a visual rendering, for example, with one or more computing systems, of one or more portions of data such as text, images, numbers, and/or combinations thereof, in a first document, for example. For example, a style characteristic may comprise a font, a character size, a character color, one or more character emphases, such as italicized, bolded, and/or underlined text and/or numbers, and/or combinations thereof that may be associated with content in first document 200 and/or second document 204, for example. Though, it should be noted that this is merely an illustrative example relating to a generated document and that claimed subject matter is not limited in this regard.

In this context, content transforming object 108 may comprise one or more computing system executable instructions capable, based at least in part on the mapping of style characteristics in style conversion object 104, modify the extracted text 206, image 208, and/or data 210 in first document 200, for example. As one potential example, content transforming object 108 may apply a particular font to at least a portion of the extracted text 206 based at least in part on a mapping of a particular font associated with the at least one portion of the one or more portions of content in the first document, though, again, it should be noted that claimed subject matter is not limited in this regard. As another potential example, content transforming object 108 may impart a particular size, resolution, relative position, and/or other characteristic to at least a portion of the extracted image 208 based at least in part on a mapping of one or more characteristics associated with image 208 in second document 204, for example, though, again, it should be noted that claimed subject matter is not limited in this regard. For further example, content transforming object 108 may impart one or more display style characteristics to at least a portion of the extracted data 210 based at least in part on a mapping of one or more display style characteristics associated with data 210 in second document 204, for example. Though, again, it should be noted that this is merely an illustrative example relating to a generated document and that claimed subject matter is in no way limited in this regard.

Figure 3:
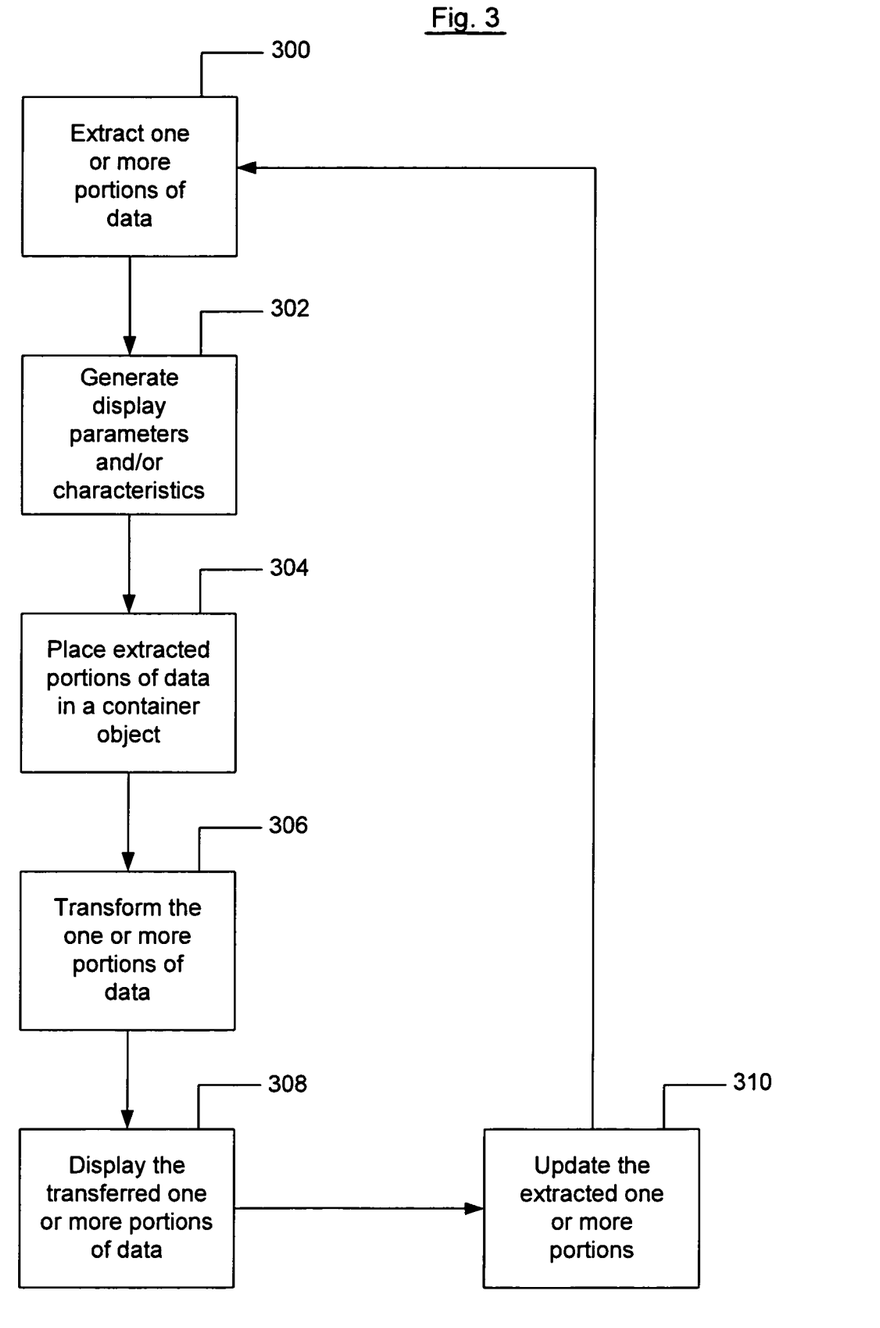
FIG. 3 is a flowchart of a process, such as a document generation and/or conversion process.

FIG. 3 is a flowchart of a process, such as a document generation and/or conversion process, for example. With regard to box 300, one or more portions of data, such as text 206, image 208, and/or data 210, for example, may be extracted from a source document, such as second document 204, for example. In this context, the one or more portions of the source document may be extracted based at least in part on one or more links in an object, such as container object 106, for example, and/or based on one or more user inputs, such as a user determining one or more portions for extracting, for example. In this context the one or more portions of the source document may be extracted at least in part by an object, such as content extraction object 102, for example. Though, it should be noted that this is merely an illustrative example relating to a document generation process and that claimed subject matter is not limited in this regard. With regard to box 302, an object, such as style conversion object 104, for example, may generate one or more display parameters and/or display characteristics based at least in part on one or more style characteristics associated with the one or more portions of the source document, though claimed subject matter is in no way limited to this example.

With regard to box 304, the extracted one or more portions of the source document may be placed into, received and/or obtained by, an object, such as container object 106, for example. In this context, the container may comprise one or more computing system executable instructions capable of receiving and/or obtaining the one or more portions of the source document and/or rendering, such as for display with one or more computing systems, for example, the extracted one or more portions of content, for example. With regard to box 306, the extracted one or more portions of the source document may be transformed by an object, such as content transforming object 108, at least in part for display in the generated document, for example. In this context, content transforming object 108 may transform the extracted one or more portions of the source document, such as by applying one or more display parameters and/or display characteristics to the extracted one or more portions, for example. By way of example, content transforming object 108 may transform the extracted one or more portions of the source document based at least in part on instructions associated with one or more objects, such as style conversion object 104, for example. In this context, style conversion object may comprise one or more mappings of display characteristics associated with the one or more portions of the source document to similar and/or the same display characteristics in the generated document, for example. In this context, transform may mean to change in composition or structure, to change the outward form or appearance of, and/or to change in character or condition, such as by changing one or more display characteristics, for example. Though, again, it should be noted that this is merely an illustrative example relating to a document generation process and that claimed subject matter is in no way limited in this regard.

With regard to box 308, an object, such as container object 106, may display the transformed extracted one or more portions from the source document, for example. In this context display may mean to produce one or more visual representations such as by using one or more display devices associated with one or more computing systems and/or platforms, for example. With regard to box 310, an object, such as content updating object 110, may from time to time update the extracted one or more portions of the source document, for example. In this context, updating the extracted one or more portions may comprise determining if one or more changes has been made to the source document, such as by checking a date on which the source document was last saved and/or modified, for example. By way of example, if the source document was last saved after the one or more portions of the source document were extracted then content updating object 110 may initiate an update process, though, again claimed subject matter is in no way limited to this example. In this context, the update process may comprise re-extracting the one or more portions from the source document, such as in the manner described with regard to box 300, and/or replacing the extracted one or more portions of the source document in the container object with the re-extracted one or more portions of the source document, such as in the manner described with regard to box 304, for example. In addition, the update process may further comprise transforming the re-extracted one or more portions of the source document, such as in the manner described with regard to box 306, and/or displaying the transformed re-extracted one or more portions of the source document, such as in the manner described with regard to box 308, for example. Though, again, it should be noted that this is merely an illustrative example relating to an update process and that claimed subject matter is not limited in this regard.

Figure 4:
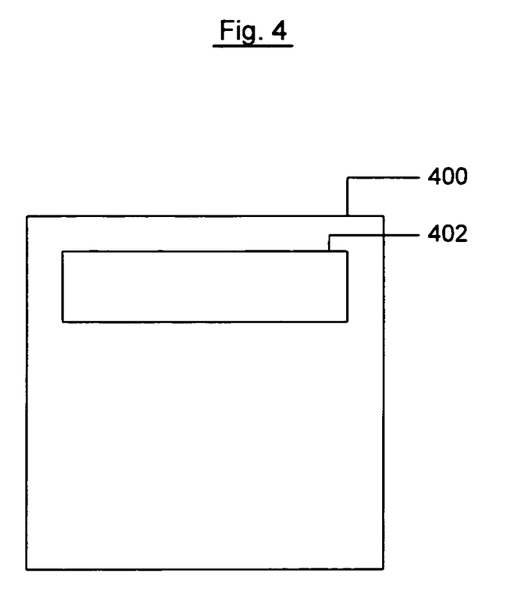
FIG. 4 is a schematic diagram of an embodiment, such as one or more computing system executable instructions stored on a computing system readable media.

FIG. 4 is a schematic diagram of an article 400 having stored thereon instructions 402 that may, when executed, such as by one or more computing systems, result in an embodiment such as one or more embodiments described above, such as the embodiment described with regard to FIG. 1, for example. For example instructions 402 may, when executed, result in an embodiment of a document generation process, such as the process described with regard to FIG. 3, for example. Though again it should be noted that this is merely an illustrative example relating to an article and that claimed subject matter is not limited in this regard.

It will, of course, also be understood that, although particular embodiments have just been described, the claimed subject matter is not limited in scope to a particular embodiment or implementation. For example, one embodiment may be in hardware, such as implemented on a device or combination of devices, as previously described, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. An apparatus, comprising:
   a memory configured to store executable instructions; and
   a processor configured to execute the executable instructions to:
     generate at least a portion of a first document based at least in part on one or more portions of data from a second document, the first document having a different file format than the second document, the second document comprising both text content and one or more style characteristics for the one or more portions of data, said at least a portion of a first document generated based on:
       content extracted from the one or more portions of data of the second document into a content container for the first document;
       a style sheet created separately from the content container, the style sheet created based on:
         a determination of one or more new style characteristics for the content in the content container, the determination based on the one or more style characteristics from the second document and on one or more user-editable rules, at least one of the one or more rules comprising a mapping rule that is configured to map structural elements by mapping a relative position of the one or more portions of content to one or more layers of the style sheet; and
         the one or more new style characteristics for the content stored in the style sheet separate from the content container for the first document; and
       a transformation of the content in the content container for the first document for display, the transformation comprising a change of one or more visual display characteristics for the content based on the one or more new style characteristics stored in the separate style sheet.

2. The apparatus of claim 1, wherein said first document comprises one or more markup language compatible documents and said second document comprises one or more word processing based documents.

3. The apparatus of claim 2, wherein said one or more style characteristics comprise font, character emphasis, character size, and/or character color.

4. The apparatus of claim 3, wherein said instructions are further executable to modify said one or more rules based at least in part on one or more user inputs.

5. The apparatus of claim 4, wherein the content container for the first document includes a link to the content in the second document, and wherein said instructions are further executable to use the link for updating said content in the content container for the first document based at least in part on one or more modifications of the content from said second document.

6. The apparatus of claim 1, wherein said content for the first document comprises one or more portions of text and/or one or more images.

7. A method, comprising:
   generating at least a portion of a first document based at least in part on one or more portions of data from a second document, the first document having a different file format than the second document, the second document comprising both text content and one or more style characteristics for the one or more portions of data;
   extracting content from the one or more portions of data of the second document into a content container for the first document;
   creating a style sheet separate from the content container by at least:

determining, based on the one or more style characteristics from the second document and based on one or more user-editable rules, one or more new style characteristics for the content in the content container, at least one of said one or more rules comprising a mapping rule that is configured to map structural elements by mapping a relative position of the one or more portions of content to one or more layers of the style sheet; and storing the one or more new style characteristics for the content in the style sheet separate from the content container for the first document; and transforming the content in the content container for the first document for display, the content being transformed by changing one or more visual display characteristics for the content based on the one or more new style characteristics stored in the separate style sheet.

8. The method of claim 7, further comprising rendering the transformed content for the first document as at least a portion of the first document.

9. The method of claim 7, wherein said content for the first document comprises one or more portions of text and/or one or more images.

10. The method of claim 7, wherein the content container for the first document includes a link to the content in the second document, and further comprising using the link for updating said content in the content container for the first document based at least in part on one or more modifications of the content from said second document.

11. The method of claim 7, wherein said one or more style characteristics comprise font, character emphasis, character size, and/or character color for said content in said second document.

12. The method of claim 7, wherein said style characteristics comprise font, character emphasis, character size, and/or character color for said content in the first document.

13. The method of claim 7, further comprising modifying the one or more rules based at least in part on one or more actions.

14. The method of claim 13, wherein said one or more actions comprise one or more user initiated actions.

15. The method of claim 13, further comprising re-extracting the content from said second document into the content container for the first document.

16. The method of claim 15, further comprising transforming, for display, said re-extracted content in the content container for the first document based at least in part on said style characteristics stored in the style sheet.

17. A computer-readable memory having stored thereon instructions which, responsive to execution by a computing device, cause the computing device to:

generate at least a portion of a first document based at least in part on one or more portions of data from a second document, the first document having a different file format than the second document, the second document comprising both text content and one or more style characteristics for the one or more portions of data;

extract content from the one or more portions of data of the second document into a content container for the first document;

create a style sheet separate from the content container, the style sheet created based on:

a determination of one or more new style characteristics for the content in the content container, the determination based on the one or more style characteristics from the second document and on one or more user-editable rules, at least one of said one or more rules comprising a mapping rule that is configured to map structural elements by mapping a relative position of the one or more portions of content to one or more layers of the style sheet; and the one or more new style characteristics for the content stored in the style sheet separate from the content container for the first document; and transform the content in the content container for the first document for display, the content transformed based on a change to one or more visual display characteristics for the content, the change based on the one or more new style characteristics stored in the separate style sheet.

18. The computer-readable memory of claim 17, wherein said instructions, responsive to execution by the computing device, cause the computing device to further display the transformed content for the first document as at least a portion of the first document.

19. The computer-readable memory of claim 17, wherein said content for the first document comprises one or more portions of text and/or one or more images.

20. The computer-readable memory of claim 17, wherein the content container for the first document includes a link to the content in the second document, and wherein said instructions, responsive to execution by the computing device, cause the computing device further to use the link for updating said content in the content container for the first document based at least in part on one or more modifications of the content from said second document.

21. The computer-readable memory of claim 17, wherein said one or more style characteristics comprise font, character emphasis, character size, and/or character color for said content in said second document.

22. The computer-readable memory of claim 17, wherein said style characteristics comprise font, character emphasis, character size, and/or character color for said content in the first document.

23. The computer-readable memory of claim 17, wherein said instructions, responsive to execution by the computing device, cause the computing device further to modify the one or more rules based at least in part on one or more actions.

24. The computer-readable memory of claim 23, wherein said one or more actions comprise one or more user initiated actions.

25. The computer-readable memory of claim 23, wherein said instructions, responsive to execution by the computing device, cause the computing device further to re-extract the content from said second document into the content container for the first document.

26. The computer-readable memory of claim 25, wherein said instructions, responsive to execution by the computing device, cause the computing device further to transform, for display, said re-extracted content in the content container for the first document based at least in part on said style characteristics stored in the style sheet.

27. A system, comprising:

a memory and a processor configured to execute instructions in the memory to implement one or more objects configured to:

generate at least a portion of a first document based at least in part on one or more portions of data from a second document, the first document having a different file format than the second document, the second document comprising both text content and one or more style characteristics for the one or more portions of data;

extract content from the one or more portions of data from the second document into a content container for the first document;

create a style sheet separate from the content container based on:

a determination of one or more new style characteristics for the content in the content container, the determination based on the one or more style characteristics from the second document and on one or more user-editable rules, at least one of the one or more rules comprising a mapping rule that is configured to map structural elements by mapping a relative position of the one or more portions of content to one or more layers of the style sheet; and the one or more new style characteristics for the content stored in the style sheet separate from the content container for the first document; and transform the content in the content container for the first document for display, the content transformed based on a change to one or more visual display characteristics for the content, the change based on the one or more new style characteristics stored in the separate style sheet.

28. The system of claim 27, wherein the content container for the first document includes a link to the content in the second document, and the one or more objects further configured to use the link for updating the content in the content container for the first document based at least in part on one or more modifications of the content from the second document.

29. The system of claim 28, wherein the one or more objects are further configured to modify the one or more rules based at least in part on one or more user selected changes.

* * * * *